Jan. 12, 1943.   C. H. CRABBS   2,308,440
FLUID TRANSMISSION
Filed Jan. 24, 1941
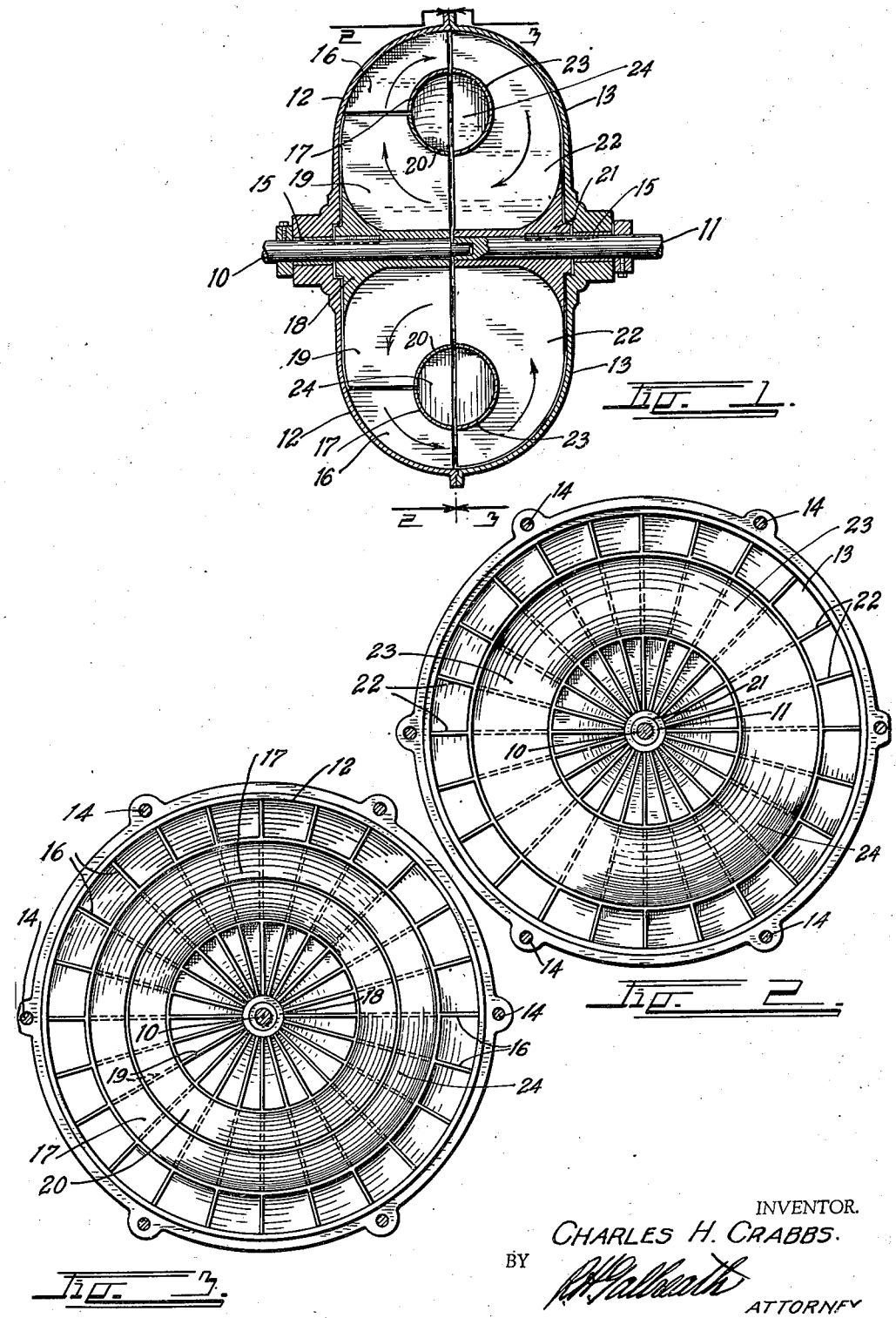
INVENTOR.
CHARLES H. CRABBS.
BY
ATTORNEY Patented Jan. 12, 1943

2,308,440

UNITED STATES PATENT OFFICE 2,308,440

FLUID TRANSMISSION

Charles H. Crabbs, Denver, Colo., assignor of fifty per cent to Victor B. Ginsberg, Denver, Colo.

Application January 24, 1941, Serial No. 375,818

1 Claim. (Cl. 60—54)

This invention relates to a fluid transmission device for transmitting power from a drive shaft to a driven shaft. The principal object of the invention is to provide a device of this character which will automatically adjust itself to load conditions on the driven shaft so as to provide the proper ratios for all conditions of speed and load.

Another object of the invention is to provide an automatic, variable-speed fluid coupling which will pick up a stationary load on the driven shaft and gradually cause the speed of the driven shaft to approach the speed of the drive shaft, without the use of gears, clutches, or other mechanical transmission devices.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a diagrammatic, longitudinal section through the improved automatically-variable fluid coupling;

Fig. 2 is a cross section therethrough taken on the line 2—2, Fig. 1;

Fig. 3 is a similar section taken on the line 3—3, Fig. 1.

In the drawing, a drive shaft is illustrated at 10 and a driven shaft at 11, in axial alignment with each other. The invention is designed to transmit power from the drive shaft 10 to the driven shaft 11 at variable speeds and at variable torque, depending upon the speed of shaft 10 and the load or resistance on shaft 11.

The improved coupling employs a circular fluid housing, preferably formed of two bowl-shaped, similar, half sections 12 and 13 as illustrated. The two sections are secured together in any desired manner, such as by means of suitable clamp bolts 14. The fluid housing is rotatably mounted upon suitable bearings, such as indicated by the bushings 15, upon both the shafts. The housing is thus free to rotate about the axis of the two shafts 10 and 11 at all times. The two sections of the housing are rounded inwardly toward each other at their peripheries to form a substantially semi-circular, in axial section, peripheral chamber as illustrated in Fig. 1.

The housing section 12 is provided with a plurality of fluid guide vanes 16 within the inwardly curved portion of its periphery. These vanes terminate concentrically about the shafts and parallel thereto at their inner extremities. At their outer extremities the vanes 16 terminate at the medial transverse plane of the housing. The inner edges of the vanes 16 are arcuate about an annular axis concentrically surrounding the shafts. The arcuate axis is so positioned that the vanes are narrower at their outer extremities than at their inner. The arcuate edges of the vanes 16 terminate in and are secured to an annular curved plate 17.

A driving rotor hub 18 is keyed or otherwise secured on the extremity of the drive shaft 10 within the housing. The hub 18 is curved outwardly adjacent the wall of the housing and is provided with a plurality of radial driving vanes 19, preferably corresponding in number and spacing to the guide vanes 16.

The outer ends of the vanes 19 closely align with the inner ends of the vanes 16 and are equal in width thereto. The inner extremities of the vanes 19 terminate in the same medial plane as the vanes 16 and are of greater width than the outer extremities. Intermediate their extremities, the side edges of the vanes join an annular curved plate 20 which is arched about the same annular axis as the plate 17 and closely approaches the edge of the latter.

A driven rotor hub 21 is keyed or otherwise secured on the driven shaft 11 within the housing. The outer extremity of the hub 21 is also curved outwardly similarly to the hub 18 to provide a streamlined fluid passage. A plurality of driven vanes 22, preferably corresponding in number and spacing to the vanes 16 and 19 project from the hub 18. The driven vanes 22 have a surface contour similar to the total surface contour of the two opposite vanes 16 and 19. Their outer edges terminate in close proximity to the wall of the fluid housing and their extremities terminate in close proximity to the outer and inner extremities, respectively, of the vanes 16 and 19.

Intermediate their extremities, the vanes 22 are arcuately notched to receive an annular channel plate 23 of semi-circular cross-section. The semi-circular cross section of the channel plate extends about the common annular axis of the plates 17 and 20 and closely approaches the annular edges of the latter.

Thus the three plates 17, 20, and 23 form a hollow, doughnut-shaped, baffle chamber 24 about the axis of the shafts 10 and 11. Each plate 17, 20 and 23 moves as a unit with its attached vanes 16, 19 and 22, respectively. In use the entire housing and the chamber 24 are substantially filled with fluid such as a light machine oil.

Operation

Let us assume, for illustration, that the shaft 10 is connected directly with the crank shaft of an automotive engine and that the driven shaft 11 is connected with the propeller shaft of an automotive vehicle.

When the engine is started the driving rotor vanes 19 act in the nature of a centrifugal pump, drawing in fluid adjacent the axis and throwing the fluid outwardly in a tangential direction from their tips.

It is desired to call attention to the fact that the driven rotor (vanes 23) has a greater diameter than the driving rotor (vanes 19). It will also be noted that the radial width of the annular fluid passage between the doughnut-like chamber 24 and the inner circumference of the housing is less than the same width between the hubs and the chamber. This difference is so proportioned as to accommodate for the increased circumference of the former passage, so that the cross sectional area of the oil flow passage will be substantially uniform throughout. Thus the velocity of flow of the fluid about the chamber 24 will be substantially uniform at all points.

The forwardly discharging fluid from the vanes 19 strikes against the vanes 16 to initiate rotation of the fluid housing. The contour of the housing and the direction of the guide vanes throws the fluid against the extreme circumference of the vanes impinging the fluid there against in an endeavor to initiate rotation of the driven shaft 11. If the engine is simply idling and if the shaft 11 is loaded the fluid will simply flow back toward the axis and again enter between the driving vanes without imparting rotation to the driven shaft. If, however, the speed of the engine is increased, the impinging reaction on the driven vanes increases until a point is reached when the shaft 11 will begin rotation in the direction of, and at a slower speed than, the shaft 10.

The transference of power to the vanes 22 by the impingement or velocity is assisted by the fact that the rotation of the housing, through the medium of the guide vanes, causes a centrifugal increase in density of fluid at the outer circumference. Since this dense fluid is whirling with the housing, it will act to urge the vanes 22 to rotate therewith.

The housing rotates at a differential speed between the speed of the two shafts 10 and 11. Gradually the driven rotor approaches the speed of the housing and gradually the housing approaches the speed of the drive shaft 10 until finally the entire assembly will rotate as a unit. Should the load increase, the driven rotor will be retarded and the differential speeds will again take effect. Increase in engine speed immediately increases the driving torque on the vanes 22 resulting in higher impingement reaction, higher density reaction, and greater power transmission.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A fluid coupling for transmitting power from a drive shaft to a driven shaft comprising: a circular housing substantially filled with fluid concentrically surrounding the adjacent extremities of a drive shaft and a driven shaft and free to rotate about and independently of both; a drive hub fixed to said drive shaft within said housing; a plurality of flat drive vanes lying in radial planes about said drive hub; similar flat radial guide vanes projecting inwardly from said housing about the periphery of said plurality of drive vanes; a driven hub fixed on said driven shaft within said housing; and a plurality of flat driven vanes projecting radially from said driven hub, said driven vanes having a radial length equal to the total radial length of said driving vanes and said guide vanes.

CHARLES H. CRABBS.